US010634078B2

(12) United States Patent
Lupescu et al.

(10) Patent No.: US 10,634,078 B2
(45) Date of Patent: Apr. 28, 2020

(54) METHODS AND SYSTEMS FOR AN EXHAUST AFTERTREATMENT DEVICE

(71) Applicant: Ford Global Technologies, LLC, Dearborn, MI (US)

(72) Inventors: Jason Lupescu, Wayne, MI (US); Steven Schwochert, Garden City, MI (US); Carolyn Hubbard, Canton, MI (US); Melissa Zamora, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 15/837,000

(22) Filed: Dec. 11, 2017

(65) Prior Publication Data

US 2019/0178181 A1 Jun. 13, 2019

(51) Int. Cl.
| F02D 41/02 | (2006.01) |
| F02D 41/06 | (2006.01) |
| F01N 3/08 | (2006.01) |
| F01N 3/18 | (2006.01) |
| F02D 41/18 | (2006.01) |

(52) U.S. Cl.
CPC ....... *F02D 41/0275* (2013.01); *F01N 3/0814* (2013.01); *F01N 3/0835* (2013.01); *F01N 3/18* (2013.01); *F02D 41/025* (2013.01); *F02D 41/064* (2013.01); *F02D 41/065* (2013.01); *F01N 2570/12* (2013.01); *F01N 2570/14* (2013.01); *F02D 41/18* (2013.01); *F02D 2250/36* (2013.01)

(58) Field of Classification Search
CPC ........ F01N 3/0814; F01N 3/0835; F01N 3/18; F01N 2570/12; F01N 2570/14; F02D 41/025; F02D 41/0275; F02D 41/064; F02D 41/065; F02D 2250/36; F02D 41/18

See application file for complete search history.

(56) References Cited

U.S. PATENT DOCUMENTS

| 5,676,912 A | 10/1997 | Sharma et al. |
| 5,914,090 A * | 6/1999 | Gottberg ............ B01D 53/9454 422/171 |
| 6,074,973 A | 6/2000 | Lampert et al. |
| 6,167,696 B1 | 1/2001 | Maaseidvaag et al. |

(Continued)

FOREIGN PATENT DOCUMENTS

WO 2012166868 A1 12/2012

OTHER PUBLICATIONS

Rasko, J. et al., "No + CO Interaction and NCO Formation on PdY Zeolite Studied by Infrared Spectroscopy," Journal of the Chemical Society, Faraday Transactions 1: Physical Chemistry in Condensed Phases, No. 12, Jan. 1, 1984, 13 pages.

(Continued)

*Primary Examiner* — Brandon D Lee
(74) *Attorney, Agent, or Firm* — Geoffrey Brumbaugh; McCoy Russell LLP

(57) ABSTRACT

Methods and systems are provided for an aftertreatment system arranged in a vehicle underbody downstream of close-coupled aftertreatment devices, the aftertreatment system including a first aftertreatment device and a second aftertreatment device adjacent one another. In one example, the first aftertreatment device is a hydrocarbon trap and the second aftertreatment device is a three-way catalyst.

19 Claims, 8 Drawing Sheets

(56) References Cited

U.S. PATENT DOCUMENTS

| | | | |
|---|---|---|---|
| 6,651,424 B1* | 11/2003 | Twigg | F01N 3/0814 60/274 |
| 7,981,834 B2 | 7/2011 | Goto et al. | |
| 8,105,559 B2 | 1/2012 | Melville et al. | |
| 9,005,560 B2 | 4/2015 | McKenna | |
| 9,040,003 B2 | 5/2015 | Andersen et al. | |
| 9,463,447 B2 | 10/2016 | Cavataio et al. | |
| 2003/0012707 A1* | 1/2003 | Yamamoto | B01D 53/9454 422/177 |
| 2007/0157604 A1* | 7/2007 | Kakuya | F02D 13/0246 60/285 |
| 2008/0184697 A1* | 8/2008 | Kojima | F01N 3/0814 60/286 |
| 2012/0291423 A1* | 11/2012 | Nakagawa | F02D 13/08 60/276 |
| 2012/0308439 A1 | 12/2012 | Chen et al. | |
| 2013/0199163 A1* | 8/2013 | Nakayama | F02D 19/0613 60/286 |
| 2014/0044625 A1* | 2/2014 | Lupescu | F01N 3/0814 423/212 |
| 2015/0158023 A1 | 6/2015 | Rajaram et al. | |
| 2017/0167417 A1* | 6/2017 | Nam | F02M 26/15 |

OTHER PUBLICATIONS

Loughran, C. et al., "Bifunctionality of palladium-based catalysts used in the reduction of nitric oxide by methane in the presence of oxygen," Applied Catalysis B: Environmental, vol. 7, No. 1-2, Dec. 7, 1995, 14 pages.

Bogner, W. et al., "Removal of nitrogen oxides from the exhaust of a lean-tune gasoline engine," Applied Catalysis B: Environmental, vol. 7, No. 1-2, Dec. 7, 1995, 19 pages.

Cordatos, H. et al., "CO, NO, and H2 Adsorption on Celia-Supported Pd," Journal of Catalysis, vol. 159, No. 1, Mar. 1996, 7 pages.

Descorme, C. et al., "Infrared study of nitrogen monoxide adsorption on palladium ion-exchanged ZSM-5 catalysts," Catalysis Letters, vol. 41, No. 3-4, Sep. 1996, 6 pages.

Ballinger, T. et al., "Hydrocarbon Trap Technology for the Reduction of Cold-Start Hydrocarbon Emissions," SAE Technical Paper, No. 970741, Feb. 24, 1997, 7 pages.

Almusaiteer, K. et al., "Isolation of Active Adsorbates for the NO—CO Reaction on Pd/Al2O3 by Selective Enhancement and Selective Poisoning," Journal of Catalysis, vol. 180, No. 2, Dec. 10, 1998, 10 pages.

Kishi, N. et al., "The research of zero level emission vehicle using gasoline engine: efficient method for using the hybrid catalyst and EHC," JSAE Review, vol. 21, No. 1, Jan. 2000, 6 pages.

Okumura, K. et al., "X-ray Absorption Fine Structure Study of the Formation of the Highly Dispersed PdO over ZSM-5 and the Structural Change of Pd Induced by Adsorption of NO," Journal of Physical Chemistry B, vol. 104, No. 5, Jan. 15, 2000, 8 pages.

Patterson, M. et al., "The effect of carbon monoxide on the oxidation of four C6 to C8 hydrocarbons over platinum, palladium and rhodium," Applied Catalysis B: Environmental, vol. 26, No. 1, Apr. 10, 2000, Available Online Feb. 21, 2000, 11 pages.

Djega-Mariadassou, G. et al., "A general model for both three-way and deNOx catalysis: dissociative or associative nitric oxide adsorption, and its assisted decomposition in the presence of a reductant Part I. Nitric oxide decomposition assisted by CO over reduced or oxidized rhodium species supported on ceria," Journal of Molecular Catalysis A, vol. 161, No. 1-2, Nov. 6, 2000, Available Online Sep. 7, 2000, 11 pages.

Pommier, B. et al., "Infrared and volumetric study of NO adsorption on Pd-H-ZSM-5," Physical Chemistry Chemical Physics, vol. 6, No. 3, Feb. 23, 2001, 6 pages.

Loffreda, D. et al., "Structure sensitivity for NO dissociation on palladium and rhodium surfaces," Journal of Catalysis, vol. 213, No. 2, Jan. 25, 2003, Available Online Dec. 2, 2002, 15 pages.

Jacquemin, S. et al., "Catalytic properties of Beta zeolite exchanged with Pd and Fe for toluene total oxidation," Studies in Surface Science and Catalysis, vol. 142, Available as early as Jan. 1, 2002, 8 pages.

Ogura, M. et al., "Co Cation Effects on Activity and Stability of Isolated Pd(II) Cations in Zeolite Matrices for Selective Catalytic Reduction of Nitric Oxide with Methane," Journal of Catalysis, vol. 211, No. 1, Oct. 1, 2002, 10 pages.

Kidokoro, T. et al., "Development of PZEV Exhaust Emission Control System," SAE Technical Paper, No. 2003-01-0817, Mar. 3, 2003, 13 pages.

Tidahy, H.L. et al., "Influence of the exchanged cation in Pd/BEA and Pd/FAU zeolites for catalytic oxidation of VOCs," Applied Catalysis B: Environmental, vol. 70, No. 1-4, Jan. 2007, Available Online Jun. 30, 2006, 7 pages.

Twigg, M., "Progress and future challenges in controlling automotive exhaust gas emissions," Applied Catalysis B: Enviornmental, vol. 70, No. 1-4, Jan. 2007, Available Online Jun. 30, 2006, 14 pages.

Yeon, T. et al., "Adsorption and desorption characteristics of hydrocarbons in multi-layered hydrocarbon traps," Microporous and Mesoporous Materials, vol. 119, No. 1-3, Mar. 1, 2009, Available Online Nov. 9, 2008, 7 pages.

Loiha, S. et al., "Catalytic enhancement of platinum supported on zeolite beta for toluene hydrogenation by addition of palladium," Journal of Industrial and Engineering Chemistry, vol. 15, No. 6, Nov. 25, 2009, Available Online Oct. 2, 2009, 5 pages.

He, C. et al., "Comparative Studies on Porous Material-Supported Pd Catalysts for Catalytic Oxidation of Benzene, Toluene, and Ethyl Acetate," Industrial & Engineering Chemistry Research, vol. 48, No. 15, Jul. 2, 2009, 11 pages.

Zhang, Z. et al., "Pd/Hβ-zeolite catalysts for catalytic combustion of toluene: Effect of SiO2/Al2O3 ratio," Journal of Natural Gas Chemistry, vol. 19, No. 4, Jul. 2010, 5 pages.

Twigg, M., "Catalytic control of emissions from cars," Catalysis Today, vol. 163, No. 1, Apr. 12, 2011, Available Online Feb. 21, 2011, 9 pages.

Millo, F. et al., "Characterization of an New Advanced Diesel Oxidation Catalyst with Low Temperature NOx Storage Capability for LD Diesel," SAE International, No. 2012-01-0373, Apr. 16, 2012, 14 pages.

Chen, X. et al., "Aging, re-dispersion, and catalytic oxidation characteristics of model Pd/Al2O3 automotive three-way catalysts," Applied Catalysis B: Environmental, vol. 163, Feb. 2015, Available Online Aug. 17, 2014, 11 pages.

Murata, Y. et al., "NOx Trap Three-Way Catalyst (N-TWC) Concept: TWC with NOx Adsorption Properties at Low Temperatures for Cold-Start Emission Control," SAE International, No. 2015-01-1002, Apr. 14, 2015, 6 pages.

Theis, J., "An assessment of Pt and Pd model catalysts for low temperature NOx adsorption," Catalysis Today, vol. 267, Jun. 1, 2016, Available Online Feb. 17, 2016, 17 pages.

Chen, H. et al., "Low Temperature NO Storage of Zeolite Supported Pd for Low Temperature Diesel Engine Emission Control," Catalysis Letters, vol. 146, No. 9, Sep. 2016, Available Online Jun. 27, 2016, 6 pages.

Vu, A. et al., "Effects of CO on Pd/BEA Passive NOx Adsorbers," Catalysis Letters, vol. 147, No. 3, Mar. 2017, Available Online Jan. 30, 2017, 6 pages.

* cited by examiner

METHODS AND SYSTEMS FOR AN EXHAUST AFTERTREATMENT DEVICE

FIELD

The present description relates generally to methods and system for treating combustion byproducts via one or more exhaust aftertreatment devices.

BACKGROUND/SUMMARY

Engine combustion of fuel may produce regulated emissions of hydrocarbon (HC), carbon monoxide (CO) and nitrogen oxides ($NO_x$) as byproducts. $NO_x$ is a known contributor to greenhouse gases. Efforts to mitigate $NO_x$ production and/or release from internal combustion engine vehicles include exhaust gas recirculation (EGR), adjusting combustion parameters (e.g., spark timing, air/fuel ratio, and the like), and inclusion of various catalytically active aftertreatment device.

While warmed-up (e.g., lit-off) aftertreatment devices may sufficiently treat regulated emissions like $NO_x$ during a wide variety of engine operating conditions, these devices may function only above an activation temperature and/or light-off temperature, and this performance degrades from customer in-use drive cycles throughout their useful life. In one example, the useful lift of such devices may be 150,000 miles or some other the threshold number of miles. Beyond the threshold number of miles, $NO_x$ output may exceed a government standard. Specifically, palladium (Pd) may sinter under high temperatures and fuel-rich conditions, causing the vast initial coverage of Pd atoms to coalesce into large particles, thereby burying Pd atoms into the cores of these large particles where they may no longer be accessible to the gas phase. Once this occurs, aftertreatment devices demand much higher temperatures to convert engine-out emissions of $NO_x$ and other combustion byproducts, thereby lengthening the duration when regulated emissions escape out the tailpipe when first starting an engine that is at ambient temperature and undergoing an engine cold-start. Said another way, following the threshold number of miles, the devices may demand a greater duration of time to reach their activation temperature, which may prolong the engine cold-start, thereby increasing emissions. The capability of engine aftertreatment to treat emissions during the cold-start period essentially determines the government certified tailpipe emissions standard that the vehicle will qualify to be sold under. From the 2015 model year to the 2025 model year, the LEV-III regulations mandate that fleet average sum of HC and NOx tailpipe emissions must be lowered by 70% on the federal test procedure drive cycle.

Current solutions to store and convert cold-start HC emissions may include the HC trap and Passive NOx Adsorber (PNA), while current solutions to store and convert NOx emissions may include the Lean NOx Trap (LNT) and Passive NOx Adsorber (PNA). These devices each have their merits and drawbacks. Some HC trap devices may be based on a monolithic substrate coated first with an aluminosilicate zeolite that can store HC molecules and then coated second with a three-way catalyst material to convert inlet emissions like a catalytic converter, but it also treats the stored cold-start emissions in the zeolite that are later released at higher temperature. Unfortunately, conventional HC traps do not have high efficiency for NOx storage, preventing use of an HC trap as a comprehensive cold start emissions solution.

The PNA is zeolite-based similar to the HC trap, except that the TWC overcoat is optional and the zeolite contains a significant amount of ion exchanged precious metals (e.g., Pd) to replace the abundant weak physical adsorption (physisorption) sites in the zeolite for strong chemical adsorption (chemisorption) and high temperature emissions storage of HC and NOx. PNA devices are designed for lean (diesel) environments that may not be exposed to excessively hot exhaust or prolonged fuel-rich modes. Pd has been observed to go from $Pd^{2+}$ (desired ionic state) to $Pd^0$ (vulnerable metallic state) as a function of temperature and oxygen concentration. This transition can occur on bulk PdO in 21% $O_2$ at about 800° C., in 1% $O_2$ at about 690° C. and in 0.001% $O_2$ at about 500° C. Thus, reduction of the Pd may occur at lower temperatures in the presence of less oxygen. When reductant (i.e., CO, HC, $H_2$) is present and exceeds the gas-phase oxidants ($O_2$, $H_2O$), and PdO is warmed-up enough to be thermally active (i.e., 200° C.), then Pd metal is formed (e.g., $Pd^0$). Continued exposure to sufficiently hot and/or fuel-rich exhaust with Pd metal in the zeolite can rapidly sinter the Pd atoms into large particles and deactivate the PNA. Hot exhaust and fuel-rich operation is typical of stoichiometric (gasoline) exhaust relative to lean (diesel) exhaust, thereby limiting the usefulness of a PNA as an effective cold start emissions solution for gasoline fuel.

The LNT may comprise platinum (Pt) for NO oxidation to $NO_2$, barium (Ba) base metal for $NO_2$ storage, and Rh for $NO_2$ reduction to $N_2$ during brief periodic fuel-rich excursions. Pt oxidizes the inlet NO to $NO_2$ when warmed to above an activation temperature of about 150° C. In some examples, over 90% of NOx emissions on a gasoline vehicle may be in the form of NO. Ba stores inlet $NO_2$ as $Ba(NO_3)_2$ until about 400° C. when $Ba(NO_3)_2$ starts to become thermodynamically unfavorable, causing an equilibrium shift that begins releasing stored NOx as temperature increases further. The NO oxidation step may be the critical first step of NOx emissions capture by an LNT as Ba does not store NO emissions. Therefore, the LNT is bound by kinetics on the low temperature side and thermodynamic equilibrium on the high temperature side, preventing use of an LNT as an effective cold start emissions solution.

However, the inventors have come up with a solution to at least partially address the above-described issues for stoichiometric exhaust gas NOx treatment during the cold-start period. In one example, the issues described above may be addressed by a system comprising a first catalyst arranged upstream of a second catalyst in a vehicle far-underbody and a controller having computer-readable instructions stored thereon that when executed enable the controller to adjust oxygen flow to the first and second catalysts via adjusting intake valves of one or more engine cylinders during one or more of a fuel cut and engine shut-off. In this way, preconditioning of the first and second catalysts may be optimized to promote increased emissions reduction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
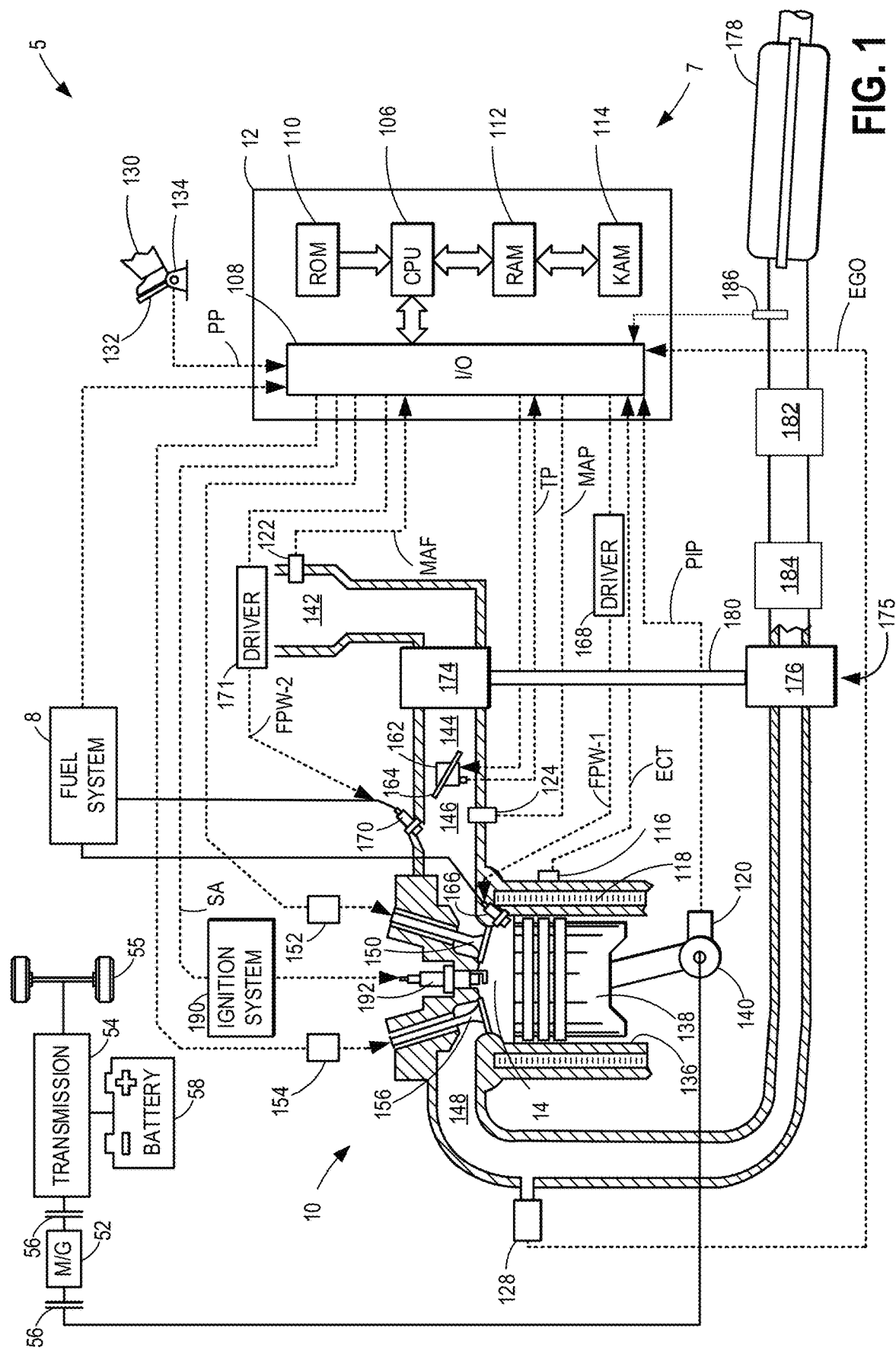
FIG. 1 shows a schematic diagram of an engine system.
Figure 2:
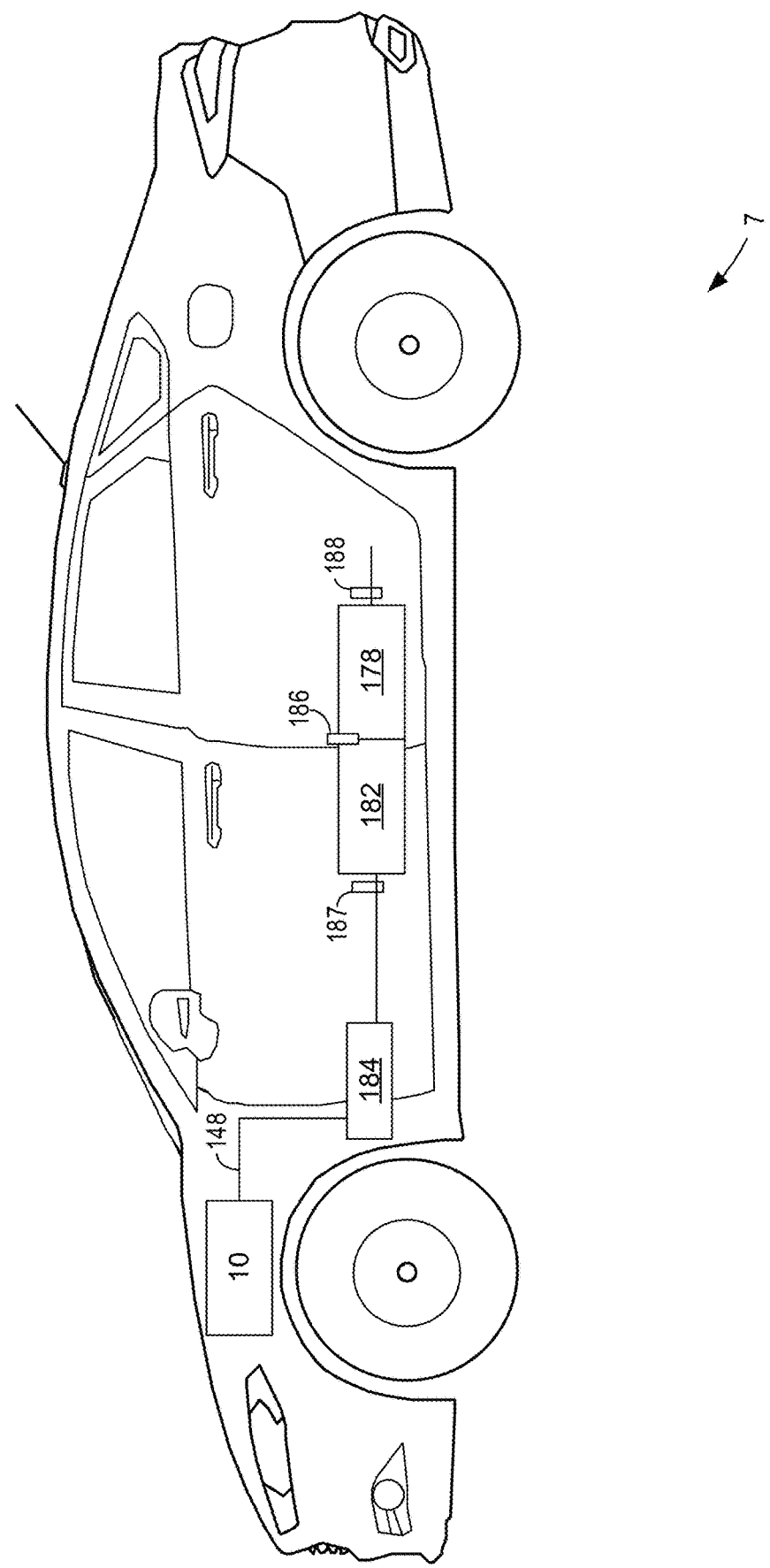
FIG. 2 shows the engine system arranged in a perspective view of a vehicle, with aftertreatment devices of the engine system being arranged in a far underbody of the vehicle.

The following description relates to systems and methods for one or more aftertreatment devices arranged in a far vehicle underbody. In one example, the one or more aftertreatment devices are arranged downstream of one or more close-coupled aftertreatment devices, as shown in FIG. 1. In some examples, the one or more aftertreatment devices arranged in the far vehicle underbody may be substantially identical to the one or more close-coupled aftertreatment devices. Close-coupled aftertreatment devices are closer to an engine than far vehicle underbody aftertreatment devices. An example of this is shown in FIGS. 1 and 2, where FIG. 2 shows a detailed location of the far vehicle underbody catalysts compared to the close-coupled catalysts.

Figure 3:
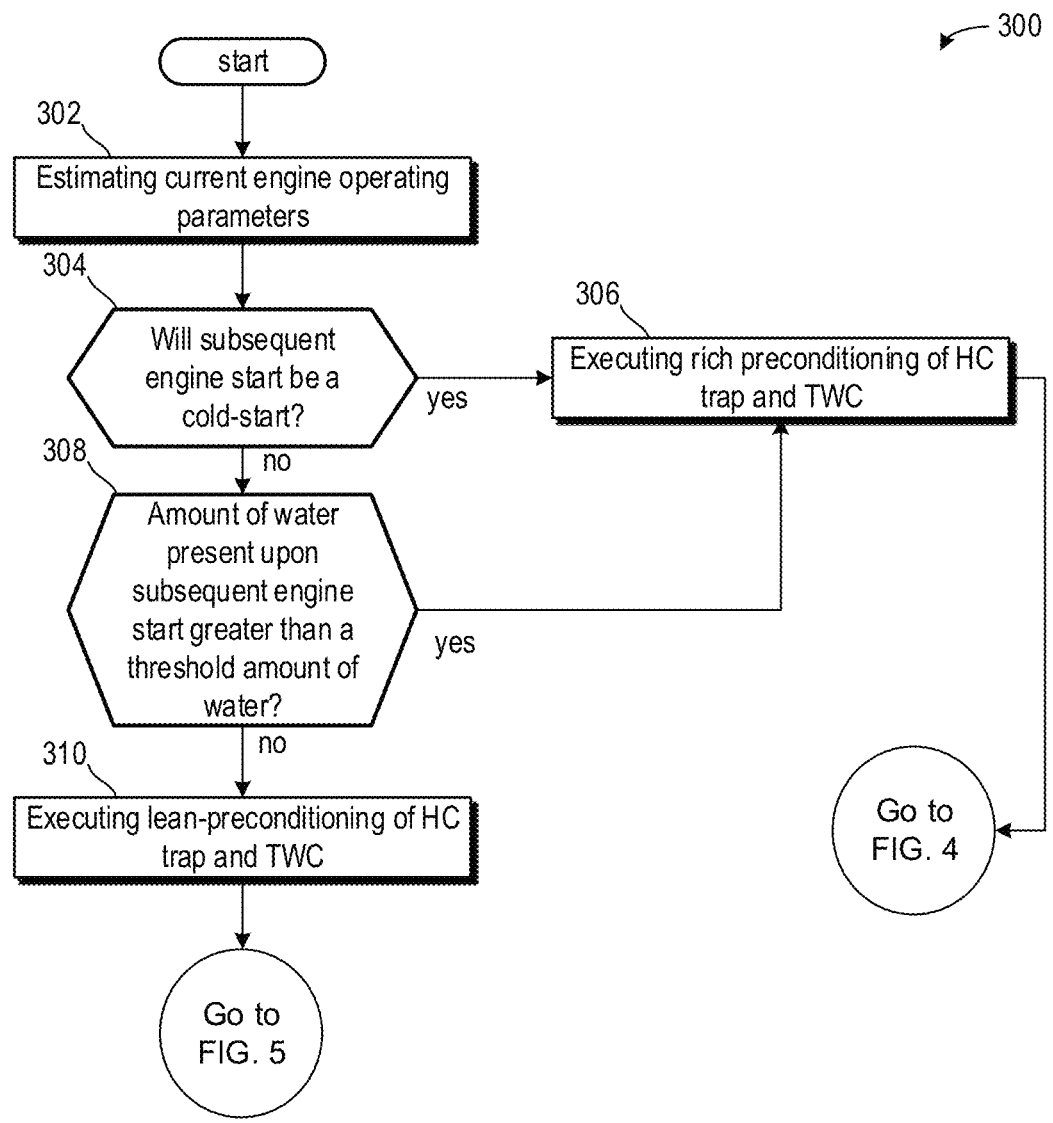
FIG. 3 shows a high level flow chart for selecting between a rich or a lean preconditioning of the aftertreatment devices.

In the method example of FIG. 3, the far vehicle underbody catalysts may include a hydrocarbon trap and a three-way catalyst (TWC). In one example, the hydrocarbon trap is arranged upstream of the TWC. Herein, upstream and downstream may be used to describe an arrangement of components relative to a gas flow. As such, the hydrocarbon trap, which is upstream of the TWC, may receive a gas before the TWC. Said another way, the TWC, which is downstream of the hydrocarbon trap, may receive a gas after the hydrocarbon trap.

Figure 4:
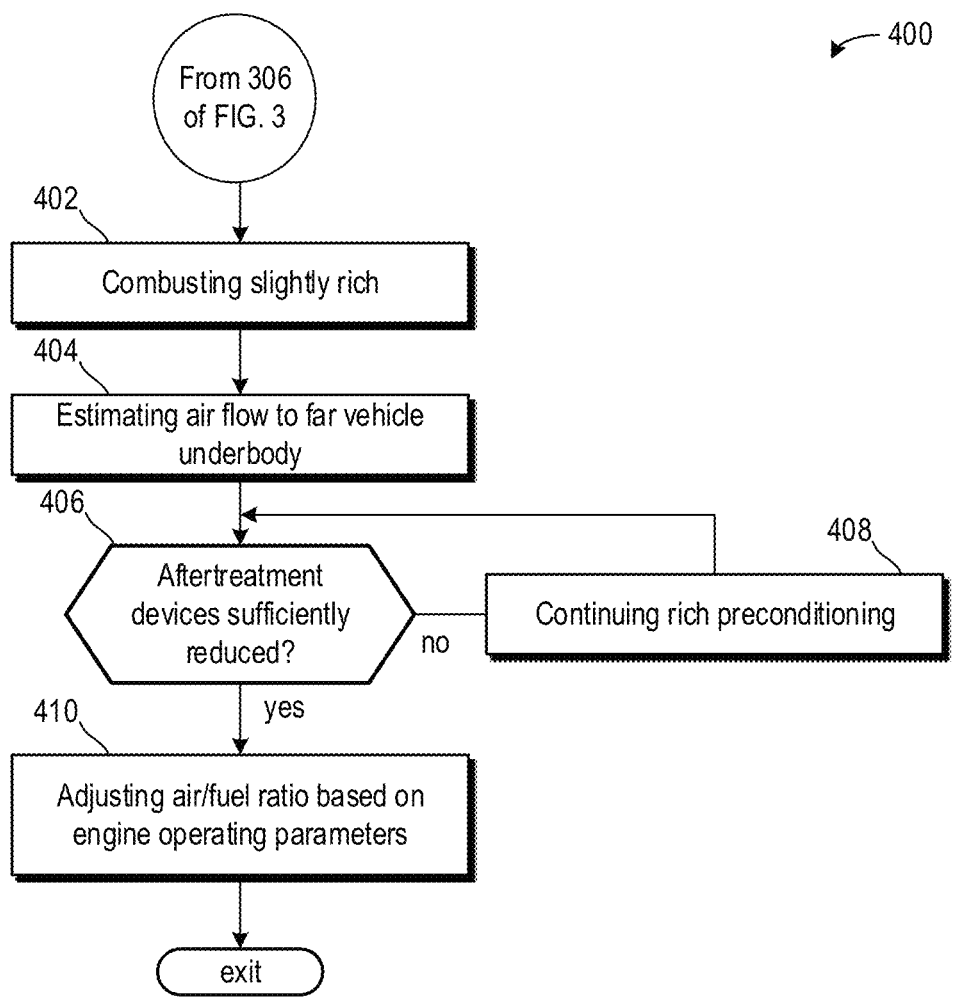
FIG. 4 shows a method for executing a rich preconditioning of the aftertreatment devices.
Figure 5:
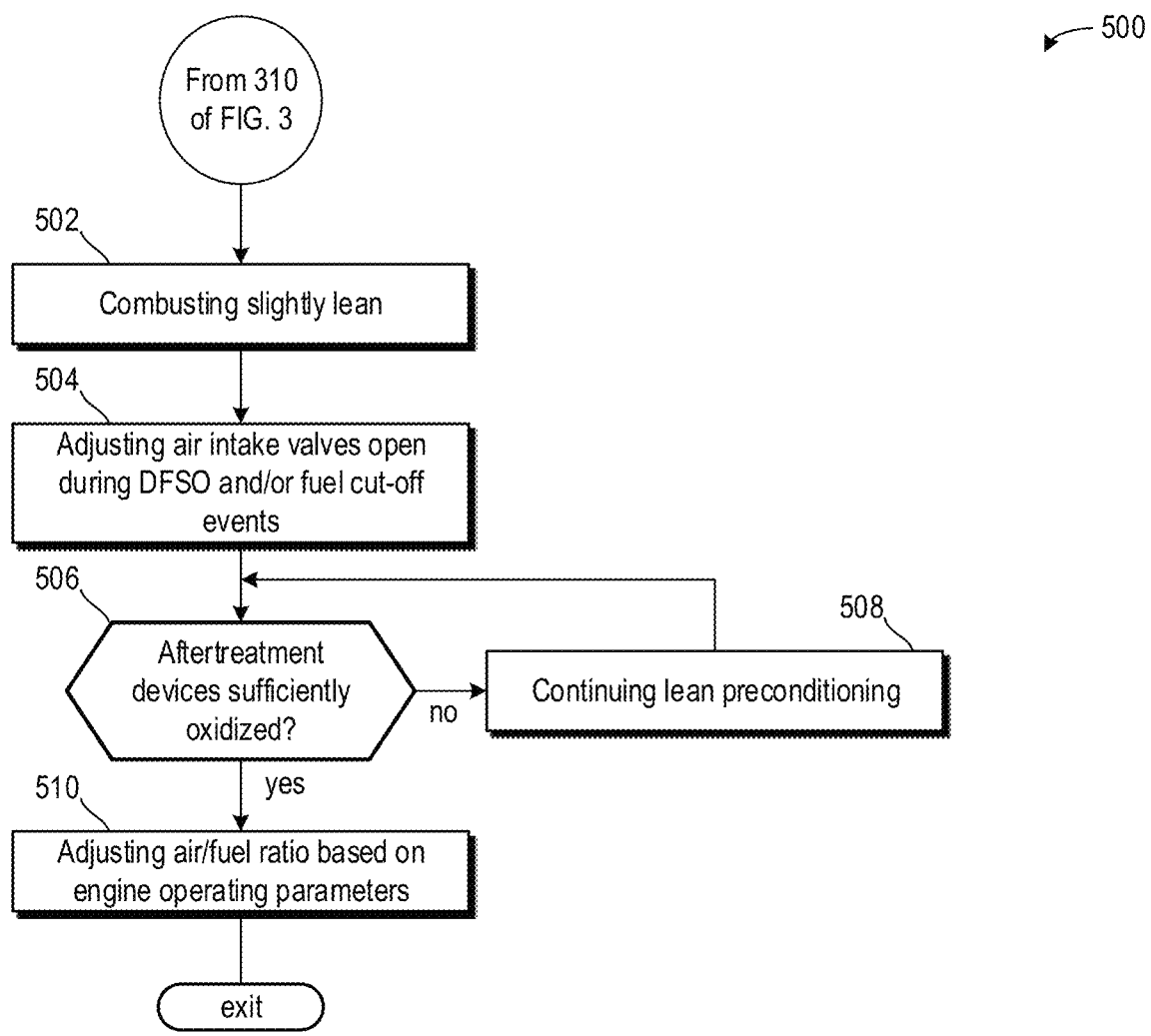
FIG. 5 shows a method for executing a lean preconditioning of the aftertreatment devices.
Figure 6:
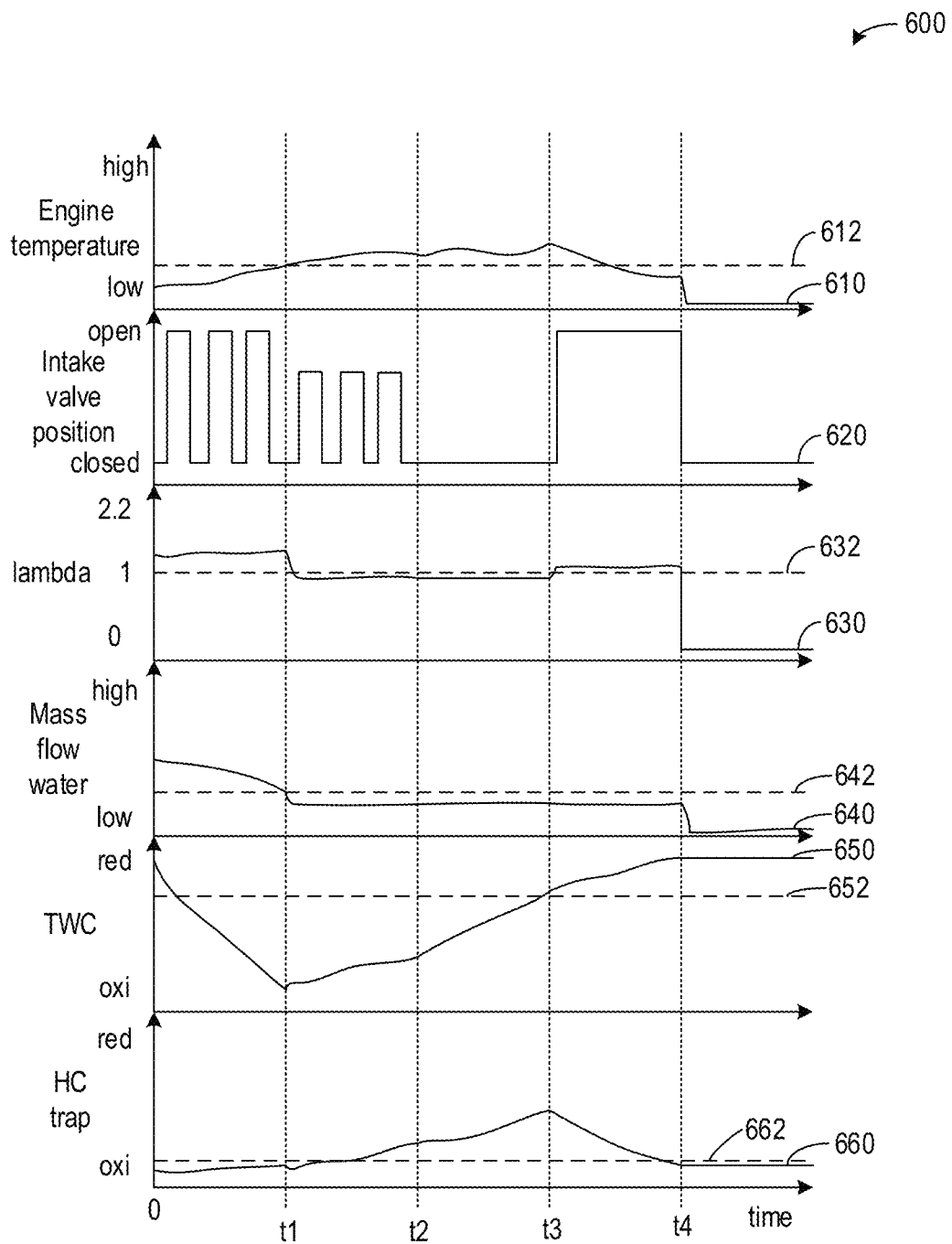
FIG. 6 shows a plot illustrating various engine and aftertreatment device conditions during a preconditioning of the devices.

A method for preconditioning the HC trap and/or the TWC for a subsequent engine start is shown in FIG. 3. FIG. 4 shows a method for a rich preconditioning of the HC trap and/or the TWC. FIG. 5 shows a method for a lean preconditioning of the HC trap and/or the TWC. FIG. 6 shows a plot of the method of FIG. 3 being executed with an example engine system, such as with the engine system of FIG. 1.

Figure 7A:
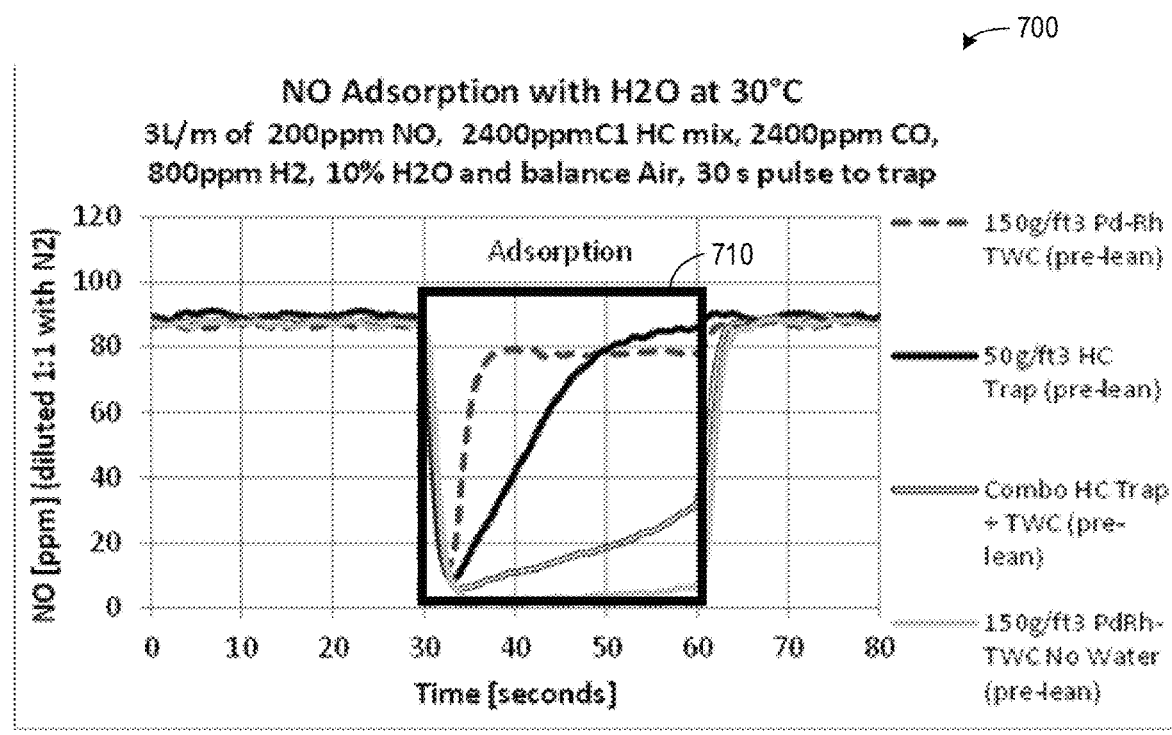
FIGS. 7A and 7B show plots of coated monolith samples exposed to a pulse of cold start gas species, including NOx, the plots differing based on a pre-lean or pre-rich conditioning of the aftertreatment devices, respectively.
Figure 7B:
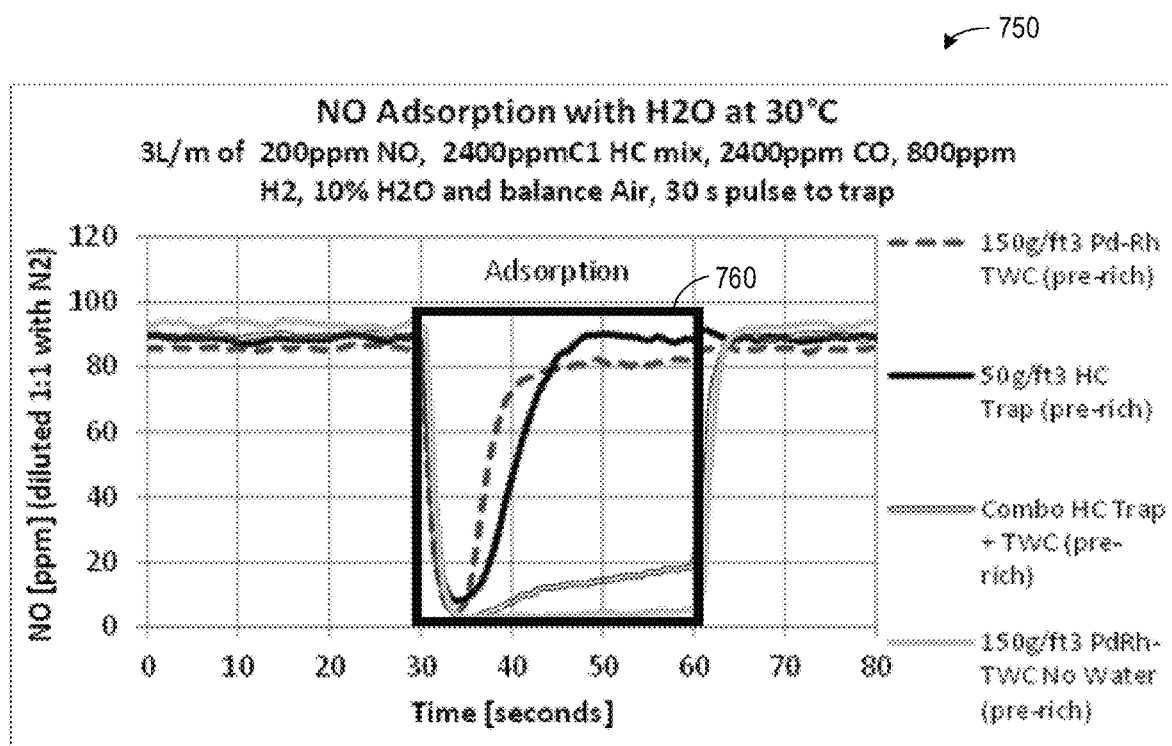
Figure 8A:
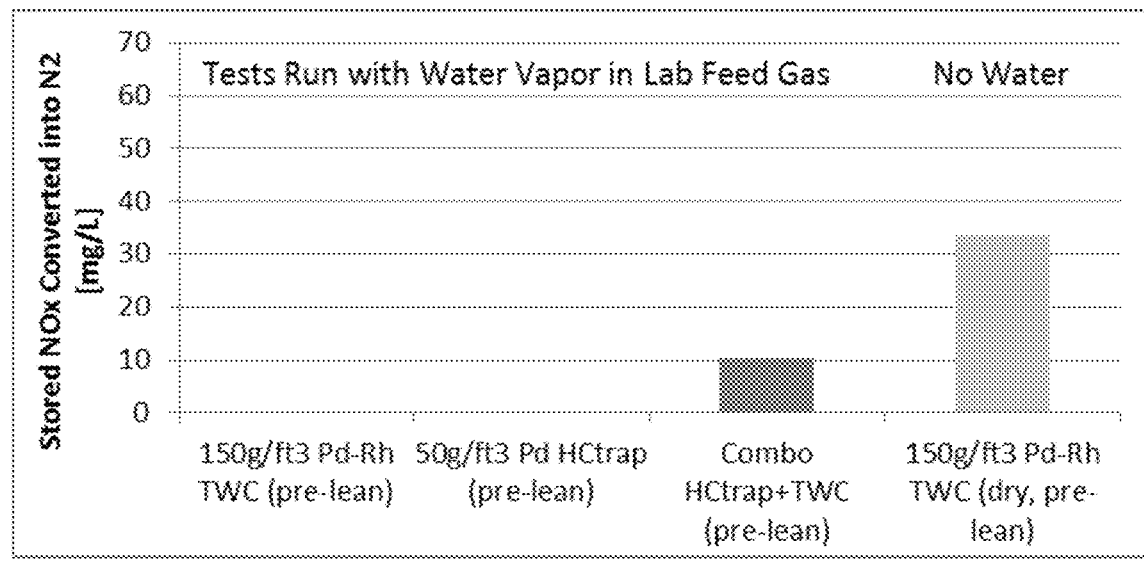
FIGS. 8A and 8B show bar charts of coated monoliths with stored NOx heated to 700° C. where the amount of $N_2$ produced was calculated on a g $N_2$/L-sample basis, the plots differing based on a pre-lean or pre-rich conditioning of the aftertreatment devices, respectively.
Figure 8B:
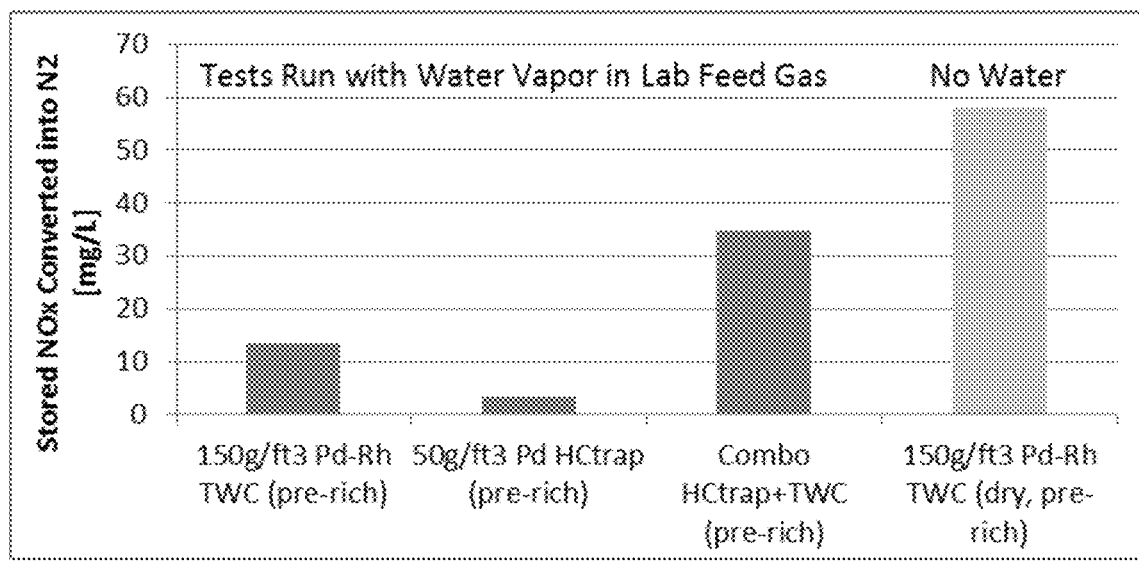

FIGS. 7A and 7B show plots of coated monolith samples exposed to a pulse of cold start gas species, including NOx, the plots differing based on a pre-lean or pre-rich conditioning of the aftertreatment devices, respectively. FIGS. 8A and 8B show bar charts of coated monoliths with stored NOx heated to 700° C. where the amount of $N_2$ produced was calculated on a g $N_2$/L-sample basis, the plots differing based on a pre-lean or pre-rich conditioning of the aftertreatment devices, respectively.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

In one example, the emission control device 178 is arranged in a far vehicle underbody. Comparatively, this location may be downstream of a close-coupled catalyst location, such as the location of first catalyst 184. In this way, the first catalyst 184 is arranged upstream of the emission control device 178. In one example, the first catalyst 184 may be a TWC, particulate filter (PF), $NO_x$ diesel oxidation catalyst, the like, or combinations thereof.

A difference between the close-coupled location and the far vehicle underbody location may be include a distance from the engine, wherein the close-coupled location is closer to the engine than the far vehicle underbody location. That is to say, components in the close-coupled location are upstream of components in the far vehicle underbody location. Additionally or alternatively, as will be described in greater detail with reference to FIG. 2, exhaust gas temperatures experienced by components in the close-coupled location may be higher than temperatures experienced by components in the far vehicle underbody position.

A second catalyst 182 may be arranged between the first catalyst 184 and the emission control device 178. The second catalyst 182 may be arranged in the far vehicle underbody. As such, the second catalyst 182 may be closer to the emission control device 178 than the first catalyst 184. The second catalyst 182 may be a TWC, particulate filter (PF), $NO_x$ diesel oxidation catalyst, hydrocarbon (HC) trap, the like, or combinations thereof.

An oxygen sensor 186 may be arranged between the second catalyst 182 and the emission control device 178. The oxygen sensor 186 may provide feedback to the controller 12 regarding an amount of oxygen present in an exhaust gas flow between the second catalyst 182 and the emission control device 178. In some examples, feedback from the control may be used to adjust oxidation states of the second catalyst 182 and the emission control device 178. For example, operation of the intake valve 150 may be adjusted based on feedback from the oxygen sensor 186, wherein the intake valve 150 may be moved to a fully closed position when it is undesired to oxidize the emission control device 178 and/or when the second catalyst is fully oxidized.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55.

Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting oxygen flow to the second catalyst 182 and to the emission control device may include adjusting an actuator of the intake valve 150 to adjust oxidation of the second catalyst 182 and the emission control device 178.

Turning now to FIG. 2, it shows the vehicle 7 of FIG. 1. As such, components previously introduced may be similarly numbered in subsequent figures. The vehicle 7 comprises the engine 10, which is fluidly coupled to the first catalyst 184, the second catalyst 182, and the emission control device 178 via exhaust passage 148. As described above, the first catalyst 184 may be arranged in the close-coupled position and the second catalyst 182 and the emission control device 178 may be arranged in the far vehicle underbody.

Herein, the first catalyst 184 may be referred to as a close-coupled catalyst 184, the second catalyst 182 may be referred to as a hydrocarbon (HC) trap 182, and the emission control device 178 may be referred to as a three-way catalyst (TWC) 178. The close-coupled catalyst 184 may be between 5-15 inches downstream of the engine 10. In some embodiments, the close-coupled catalyst 184 may be between 7-13 inches downstream of the engine 10. In some embodiments, the close-coupled catalyst 184 may be between 9-11 inches downstream of the engine 10. In one example, the close-coupled catalyst is 10 inches downstream of the engine. The HC trap 182, which is downstream of the close-coupled catalyst and upstream of the TWC, may be downstream of the close-coupled catalyst 184 by a distance between over 10 inches. In some embodiments, the HC trap 182 is downstream of the close-coupled catalyst 184 by a distance over 15 inches.

The HC trap 182 and the TWC 178 may experience exhaust gas temperatures lower than temperatures experienced by the first catalyst 184. As an example, the first catalyst 184 may experience exhaust gas temperatures between 840 to 880° C. while the HC trap 182 and the TWC 178 may experience exhaust gas temperatures between 740 to 840° C. This temperature difference may result in the first catalyst 184 degrading more quickly than the HC trap 182 and TWC 178. As such, after a threshold number of miles where the first catalyst 184 is likely to be degraded, the vehicle 7 may rely more on the HC trap 182 and the TWC 178 to treat $NO_x$ and HC emissions, especially during cold-start conditions. The threshold number of miles may be based on a number of miles driven (e.g., 150,000 miles) by the vehicle that may be associated with a decrease in catalytic activity of the first catalyst 184 large enough to no longer decrease emissions to a desired amount. Thus, degradation of the first catalyst 184 may include a reduction in catalytic activity to a degree such that the first catalyst 184 does not treat exhaust gas emissions to the desired amount.

The HC trap 182 may comprise a porous zeolite with one or more precious or base transition metals that may be coated onto the zeolite or may be impregnated therein. The HC trap adsorbent material may be relatively acidic to store emissions of water and hydrocarbon from the engine. As an example, the HC trap adsorbent material may comprise an aluminosilicate zeolite with a ratio of Si to $Al_2$ of less than 40. Additionally or alternatively, the HC trap 182 may further comprise one or more metals to assist in the adsorption and conversion of hydrocarbons and water. For example, the zeolite may comprise a framework, exchanged or impregnated metals, where the metals provide acidity or water adsorption features even though the zeolite framework Si/$Al_2$ is greater than 40 and would otherwise have limited or no affinity for water. In some examples, the zeolite may comprise a ratio of Si to $Al_2$ being less than 40 and one or more metals configured to assist in water adsorption. The ratio of Si to $Al_2$ may be between 5 and 40. In some embodiments, the ratio of Si to $Al_2$ may be between 5 and 20. In some embodiments, the ratio of Si to $Al_2$ may be between 5 and 10.

The HC trap zeolite may comprise a washcoat comprising 20 to 100 g/ft$^3$ of precious group metals (PGM), wherein a majority of the composition of the PGM is Pd. In some embodiments, the washcoat may comprise 20 to 70 g/ft$^3$ of PGM. In some embodiments, the washcoat may comprise 30 to 60 g/ft$^3$ of PGM. In one example, there is exactly 50 g/ft$^3$ of PGM. The PGM may include greater than 50% Pd. In some embodiments, additionally or alternatively, the PGM includes between 50 to 100% Pd. In some embodiments, additionally or alternatively, the PGM includes between 70 to 100% Pd. Additionally or alternatively, in some embodiments, the PGM includes between 85 to 95% Pd. In one example, there is at least 94% Pd in the PGM washcoat. Since there is an aftertreatment device downstream, the HC trap 182 may be without the TWC layer (e.g., a PNA) or be without metals in the zeolite or be some other adsorbent material, so long as it effectively traps water.

The TWC 178 may comprise a high loading and dispersion of catalytically active materials, including but not limited to one or more of Rh, Pd, Cu, and Ag. While it is known by those of ordinary skill in the art that ionic Pd in zeolite stores NOx in lean (diesel) exhaust gas applications, Rh may be preferred over Pd in stoichiometric (gasoline) exhaust gas applications since reduced Pd prefers to adsorb CO rather than NOx, unlike Rh. These metals may be introduced via spraying a washcoat onto a zeolite of the TWC 178, zeolite ion-exchange, and/or impregnation. These catalytically active materials may be capable of forming chemisorbed NOx, such as nitrosyl species (e.g., Pd—NO) or dissociated species (e.g., Rh—N and Rh—O). The catalytically activate materials may release and/or desorb the $NO_x$ compounds upon reaching a catalytic reduction temperature of $NO_x$. In one example, the catalytic reduction temperature is 200° C. Therefore $NO_x$ is reduced to $N_2$ in conjunction with reductant (i.e., CO, HC) present in sub stoichiometric exhaust gas in the far underbody location. Said another way, the $NO_x$ compounds may be released form the TWC after being reduced. In one example, the $NO_x$ is not released from the TWC until it has been reduced to $N_2$.

The TWC 178 may comprise a high loading and dispersion of reducible oxygen storage materials, such as ceria-zirconia (CZO). Once reduced, CZO provides a reservoir of oxygen vacancies that can be refilled by O from stored NOx at low temperatures. NOx adsorption onto CZO oxygen vacancies may occur without dissociation and may demand gas-phase reductant to progress NOx reduction to $N_2$ assisted by precious metals. Alternatively, reduced CZO may be reoxidized by adsorbed O from previously dissociated NOx on Rh, making more sites for Rh—NOx adsorption.

In some examples of an engine exhaust aftertreatment system where water adsorbent materials are not included present, the exhaust gas produced from fuel combustion may comprise water, where the water may fill the sites of the TWC washcoat materials and compete for the active sites configured to adsorb $NO_x$. That is to say, water may coordinate to the catalytically active materials of the TWC 178, such that the TWC 178 is no longer in a catalytically reactive state capable of adsorbing $NO_x$. To address this issue, the HC trap 182 is configured to capture a threshold amount of water, upstream of the TWC 178, such that the TWC 178 materials may be able to capture $NO_x$ during cold start in a relatively dry environment where its active sites are relatively free of competition. Once the $NO_x$ has been adsorbed onto the TWC 178, water may enter the TWC 178 without displacing the chemisorbed $NO_x$ therein.

Said another way, water and $NO_x$ may compete to bind to catalytically active materials of the TWC 178. However, once either water or $NO_x$ is bound to PGM of the TWC 178, they are not released until a threshold temperature is reached (e.g., 200° C.). For these reasons, a sizing of the HC trap 182 and the TWC 178 may be coordinated to sufficiently treat $NO_x$ emissions during engine conditions susceptible to high engine $NO_x$ output (e.g., cold-start). As an example, for a cold-start lasting between 0-60 seconds, the TWC 178 may be sized to capture an amount of $NO_x$ equal to an amount of $NO_x$ released by the engine during the cold-start for 60 seconds. Similarly, the HC trap 182 may be sized to capture an amount of water released by the engine for 60 seconds. In some examples, the HC trap 182 may be sized to capture even more water than the amount of water released by the engine for 60 seconds to take into account ambient humidity among other factors (e.g., condensate present in vehicle pipes). In this way, the HC trap 182 may be sized to capture water for an amount of time long enough such that the TWC 178 may adsorb a majority, if not all, of the engine output $NO_x$ generated during one or more engine operating parameters. The HC trap 182 and the TWC 178 may be next to one another. For two separately coated monolith substrates, an outlet of the HC trap 182 and an inlet of the TWC 178 may be in face-sharing contact. Alternatively they may be zone-coated on the same monolith substrate with adsorbent materials (i.e., zeolite, HC trap or PNA) in the front zone and the TWC in the rear zone, or they may be coated in layers on the same substrate with TWC materials under adsorbent materials, or mixed together.

In one example, the HC trap 182 may comprise a passive $NO_x$ adsorber (PNA) coated with TWC materials and 50 g/ft³ PGM (Pd/Rh) distributed over the adsorbent and TWC washcoats. The TWC may comprise 150 g/ft³ PGM (Pd/Rh). The PNA of the HC trap 182 may function to capture water in an exhaust gas flow, thereby enabling the TWC to capture $NO_x$.

In some embodiments, the HC trap 182 may comprise 2-7 g/in³ of the zeolite material described above, 1-4 g/in³ of TWC material (e.g., a material similar to TWC 178) 0.01 to 10 wt. % base transition metals, and 1-200 g/ft³ platinum group metals. In one example, the HC trap 182 comprises exactly 4.5 g/in³ of zeolite material, 2.5 g/in³ of TWC material, 1 wt. % base transition metals, and 100 g/ft³ platinum group metals. The TWC 178 may be substantially identical or different than the HC trap. For example, the TWC 178 may comprise barium hydroxide, while the HC trap 182 may not. Barium hydroxide may promote $NO_x$ adsorption while degrading HC oxidation capabilities. With regards to precious metals, the HC trap 182 may comprise a greater proportion of Pd and/or Pt whereas the TWC 178 may comprise a greater proportion of Rh. Thus, the differences between the two may arise based on a favorability to capture $NO_x$, which may be associated with the TWC 178, and a favorability to oxidize HCs, which may be associated with the HC trap 182.

The oxygen sensor 186 may be arranged between the HC trap 182 and the TWC 178 as shown. Additionally or alternatively, a gap may be arranged between the HC trap and TWC 178, wherein the oxygen sensor 186 may be arranged in the gap.

The vehicle 7 may further comprise a temperature sensor 187 arranged upstream of the HC trap 182 and a temperature sensor 188 arranged downstream of the TWC 178. In one example, engine operating parameters may be adjusted based on feedback from one or more of the temperature sensors 187, 188 and the oxygen sensor 186. For example, if one or more of the temperature sensors indicates that the TWC temperature is greater than the $NO_x$ reduction temperature, then engine operating parameters may be adjusted to enable the HC trap 182 to treat HCs rather than capture water. These adjustments along with other adjustments based on feedback from the oxygen sensor will be described in greater detail below with reference to FIG. 2.

Turning now to FIG. 3, it shows a method 300 for preconditioning the HC trap and TWC based on one or more engine operating parameters. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

In one example, the method 300 and the other methods included herein are executed in response to the close-coupled catalysts being degraded (e.g., first catalyst 184 of FIG. 1). Degradation of one or more of the close-coupled catalyst may be determined in response to one or more of the threshold vehicle mileage being surpassed, the temperature of the catalyst being below the activation threshold and feedback from an exhaust gas sensor. For example, the exhaust gas sensor may be a $NO_x$ sensor downstream of the close-coupled catalysts, where the $NO_x$ sensor senses an amount of $NO_x$ leaking through the close-coupled catalysts being greater than a threshold amount. As such, the close-coupled catalysts may be degraded and the vehicle may begin to rely on the HC trap and TWC arranged in the far vehicle underbody (e.g., HC trap 182 and TWC 178).

The method 300 begins at 302, where the method 300 may include determining, estimating, and/or measuring current engine operating parameters. Current engine operating parameters may include, but are not limited to, one or more of catalyst temperature, engine-off time, throttle position, engine temperature, engine speed, manifold pressure, vehicle speed, exhaust gas recirculation flow rate, and air/fuel ratio.

The method 300 may proceed to 304, where the method 300 may include determining if a subsequent engine start will be a cold-start. The engine start may be a cold-start when an engine temperature is less than a threshold temperature. The threshold temperature may be equal to a fuel vaporization temperature at standard pressure such that if the ambient engine temperature is less than the fuel vaporization temperature, then the engine may be undergoing a cold-start. Thus, if the engine temperature is less than a lower end of the desired engine operating temperature range for gasoline fuel vaporization (e.g., 88° C.), then the engine may be undergoing a cold-start. Additionally or alternatively, the threshold temperature may be based on a desired catalyst operating temperature, wherein the desired catalyst operating temperature is a temperature above 200° C.

The above conditions may be determined for a subsequent engine start based on feedback from one or more of a navigation system, temperature sensors, data stored in a look-table, and the like. For example, the navigation system may be able to determine both a current ambient temperature and a forecast for future ambient conditions (e.g., a 5-day forecast). As such, the navigation system may determine that a cold-start is likely to occur upon a subsequent engine restart if the ambient temperature is cold (e.g., less than 20° C.).

Additionally or alternatively, the temperature sensors may periodically provide feedback between a previous engine off event and the subsequent engine start. For example, the temperature sensors may periodically provide feedback regarding a temperature of one or more of engine coolant, an underbody HC trap, and an underbody TWC. If, for example, the engine coolant temperature falls below the ambient temperature during the period between the previous engine off and the subsequent engine start, then it may be determined that the subsequent engine start will be a cold-start.

Additionally or alternatively, data stored in a look-up table may be used to determine if the subsequent engine start will be a cold-start. For example, the look-up table may be a multi-input look up table, wherein the conditions prior to the subsequent engine start for looking up data in the look-up table may include time of day, ambient temperature, location, and the like. For example, if a vehicle is shut-off at a known location where the shut-off may be greater than a threshold duration of time (e.g., over 2 hours), then it may be determined that the subsequent engine start may be a cold-start. Additionally or alternatively, if the engine is shut-off between a range of time (e.g., 12:00 to 5:00 A.M.), then it may be determined that the subsequent engine start will be a cold-start.

If at 304 the method 300 determines that the subsequent engine start is going to be a cold-start, then the method 300 may proceed to 306 to execute rich preconditioning of the HC trap and TWC arranged in the far vehicle underbody. This is further described in FIG. 4.

If the method 300 determines at 304 that the subsequent engine start will not be a cold-start, then the method 300 continues to 308 to determine if an amount of water present upon a subsequent engine start will be greater than a threshold amount of water. In one example, the threshold amount of water is based on an amount of water the HC trap arranged in the far vehicle underbody is configured to store. The threshold amount of water may be a non-zero number. In some examples, the amount of water which will be present upon the subsequent engine start may be based on feedback from one or more of a charge air cooler (CAC) humidity sensor, an EGR cooler humidity sensor, and information stored in a look-up table. As one example, if there is greater than a threshold amount of condensate in the CAC, then the amount of water that will be present upon the subsequent engine start may be greater than the threshold amount of water. As such, the HC trap may not be able to sufficiently trap water for a threshold amount of time (e.g., 1-60 seconds) for the TWC to capture a sufficient amount of $NO_x$. Said another way, water may leak through the HC trap when the amount of water is greater than the threshold amount of water, wherein the water may bind to surfaces of the TWC and prevent $NO_x$ adsorption.

If the amount of water present upon the subsequent engine start is going to be greater than the threshold amount of water, then the method 300 may proceed from 308 to 306 to execute rich preconditioning of the HC trap and TWC, as will be described in greater detail with respect to FIG. 4.

If the amount of water present upon the subsequent engine start is going to be less than or equal to the threshold amount of water, then the method 300 may proceed from 308 to 310 to execute lean preconditioning of the HC trap and/or TWC. Lean preconditioning of the HC trap and/or the TWC is described in greater detail with respect to FIG. 5.

Turning now to FIG. 4, it shows a method 400 for executing rich-preconditioning of the HC trap and TWC. As described above, the method 400 may begin following 306 of method 300 of FIG. 3. As such, the method 400 may begin under the pretense that engine $NO_x$ output may be high and/or the $NO_x$ adsorbing abilities of the TWC may be decreased due to a high water content upon the subsequent engine start. By executing the rich-preconditioning, the TWC may be returned to a chemical state more suitable for capturing $NO_x$.

By continuously operating slightly rich, as will be described below with respect to the description of FIG. 4, the rich preconditioning may reach both the HC trap and the TWC (e.g., HC trap 182 and TWC 178 of FIG. 2). Exhaust gas conditions downstream of a close-coupled catalyst (e.g., first catalyst 184) may be more rich than exhaust gas conditions upstream of the close-coupled catalyst due to oxygen consumption at the close-coupled catalyst. As such, operating slightly lean may include operating with lambda values between 0.95 and 1.05, the lambda values estimated by an exhaust gas sensor upstream of the close-coupled catalyst. Reductants (CO, $CH_4$, and the like) may flow to the HC trap and TWC, where the reductants may regenerate one or more materials of the HC trap and TWC.

The method 400 begins at 402, where the method 400 may include combusting slightly rich. Combusting slightly rich may include an air/fuel ratio being less than 1.0. As is known by those of ordinary skill in the art, an air/fuel ratio of 1.0 corresponds to a stoichiometric air/fuel ratio, air/fuel ratios less than 1.0 are considered rich and air/fuel ratios greater than 1.0 are considered lean. Rich air/fuel ratios have a greater amount of fuel relative to an amount of air compared to lean air/fuel ratios. A range of the air/fuel ratio which the slightly rich combustion occurs is 0.9 to 0.99. In some embodiments, the range is from 0.93 to 0.99. In some embodiments, additionally or alternatively, the range is from 0.95 to 0.99. In one example, the slightly rich combustion is exactly 0.95. The slightly rich combustion is implemented during all combusting conditions of the engine, in one example. Thus, the slightly rich combustion may occur during high loads, mid loads, low loads, idle, and the like. During fuel cut-off events (e.g., DFSO, start/stop, and the like), intake valve operation may be adjusted such that the intake valve is less open and/or closed. In one example, intake valve operation during fuel cut-off is in a fully closed position, wherein intake air does not flow to the combustion chamber (e.g., intake valve 150 and combustion chamber 14 of FIG. 1). By doing this, a rich exhaust gas environment may continuously flow through the aftertreatment devices (e.g., HC trap 182 and TWC 184 of FIG. 2), thereby reducing reactive elements arranged thereon.

The method 400 may proceed to 404, where the method may include monitoring air flow to the far vehicle underbody. As described above with respect to FIG. 2, the far vehicle underbody may include a HC trap 182 and a TWC 178. The amount of air flowing to the aftertreatment devices may be estimated based on feedback from at least one oxygen sensor arranged directly downstream of the first catalyst (e.g., first catalyst 184 of FIG. 2). In some examples, intake valve operation may be adjusted in response to the amount of air flowing to the aftertreatment devices. For example, if the amount of air is too high for the rich preconditioning to reduce the aftertreatment devices, then the intake valve may be moved to more closed positions to decrease the amount of air flowing.

The method 400 may proceed to 406 where the method includes determining if the aftertreatment devices are sufficiently reduced. In some embodiments, the determination may be based on data stored in a multi input look-up table, where the inputs may include vehicle mileage, engine $NO_x$ output, exhaust gas humidity, exhaust gas temperature, and the like. In some embodiments, additionally or alternatively, the determination may be based on conducting the lean pre-conditioning for a threshold amount of time, wherein the threshold amount of time is based on an amount of time sufficient to operate slightly rich and reduce the aftertreatment devices. The threshold amount of time may decrease in response to a richer rich pre-conditioning and may increase in response to a less rich pre-conditioning. Additionally or alternatively, the threshold amount of time may increase in response to an amount of air flowing to the aftertreatment devices.

If the devices are not sufficiently reduced, then the method may continue to execute the rich pre-conditioning. If the devices are sufficiently reduced, then the rich pre-conditioning may be terminated and the air/fuel ratio may be adjusted based on driver demand and/or other engine operating conditions.

In some embodiments, additionally or alternatively, the method 400 may include one or more predictive conditions wherein the rich preconditioning is intrusively executed. For example, a predictive condition may include determining if an engine off event is occurring within a threshold. The threshold may be based on one or more of a threshold amount of time, a threshold mileage, or a combination of the two. The threshold time may be based on an amount of time previously determined to be sufficient to complete a rich pre-conditioning of the HC trap and TWC. Similarly, the threshold mileage may be based on a mileage needed to complete the rich pre-conditioning of the HC trap and TWC. However, it will be appreciated that the rich pre-conditioning may occur during idle and other vehicle events where locomotion of the car is substantially zero. A destination may be input into a navigation system, wherein the threshold to the engine off event may be based on a specific location along a route to the destination. The specific location may be associated to the route being 90-95% completed. In this way, 5-10% of the route may be utilized for conducting the rich pre-conditioning. Additionally or alternatively, the threshold may some time prior to the vehicle reaching a stop light.

Additionally or alternatively, if the destination is not input into the navigation system, then the navigation system may predict an intended final destination. Predicting the final destination may include monitoring a current route taken by a vehicle operator and comparing the current route to known routes stored in memory or determined in real-time. As an example, the navigation may determine in real-time a route between a current vehicle location and a saved known destination (e.g., "home"). If the current route matches the route determined in real-time, then the vehicle may predict the saved known destination is the same as the intended final destination.

Turning now to FIG. 5, it shows a method 500 for executing the lean preconditioning of the aftertreatment devices. The lean preconditioning may allow the HC trap to release HCs stored thereon.

The method 500 begins at 502, following 310 of method 300 of FIG. 3, wherein the method 500 may include combusting slightly lean. Combusting slightly lean may include combusting at or above a lambda of 1.0. In some embodiments, the lambda value may be between 1.0 to 1.1. In some embodiments, additionally or alternatively, the lambda value may be between 1.0 to 1.05. In some embodiments, additionally or alternatively, the lambda value may be between 1.0 to 1.02. Combusting slightly lean may include adjusting one or more engine operating parameters, where the one or more engine operating parameters may include one or more of adjusting a throttle to a more open position, decreasing a primary injection pressure, decreasing a secondary injection pressure, and increasing intake valve opening.

The method 500 may proceed to 504, where the method 500 may include adjusting air intake valve positions during DFSO and/or other fuel cut-off events. The adjusting may include moving the intake valves to more open positions such that more intake air may flow through the unfueled cylinders. By doing this, a concentration of air in the exhaust passage may increase.

The method 500 may proceed to 506, where the method 500 may include determining if the aftertreatment devices are sufficiently oxidized. The determining may be based on an amount of air flow flowing to the far vehicle underbody. The amount may be estimated based on feedback from an oxygen sensor arranged between the first catalyst and the HC trap. Additionally or alternatively, the determination may be based on data stored in a multi-input look up table, wherein a combination of intake valve position, throttle position, and duration of each of the lean combustion and fuel cut-off events may be used to determine if the aftertreatment devices have received a sufficient amount of air to be oxidized a desired amount.

If the aftertreatment devices are not sufficiently oxidized, then the method 500 may proceed to 508 to continue the lean preconditioning. If the aftertreatment devices are sufficiently oxidized, then the method 500 may proceed to 510 to adjust the air/fuel ratio, and therefore a measured lambda value, based on engine operating parameters. However, exhaust flow to the far vehicle underbody may continue to be measured to ensure the lean preconditioning is not undone by future engine operating parameters. For example, if the engine operating parameters are adjusted to a rich engine operating condition, then the lean preconditioning may be undone and the aftertreatment devices no longer in an oxidized state. In some examples, the controller may relay a prompt to a driver via the navigation system alerting the driver to adjust current driving behavior. Additionally or alternatively, the controller may intrusively adjust current operating parameters to prevent reduction of the aftertreatment devices following the lean preconditioning.

In some examples of the method 500, it may be undesired to flow oxygen to the TWC, as this would oxidize the catalysts stored therein, which may reduce the TWC's ability to capture $NO_x$. As such, for some embodiments of the method 500, an oxygen sensor may be arranged between the HC trap and the TWC, wherein the oxygen sensor may provide feedback regarding oxygen slip through the HC trap. If the oxygen slip reaches a value greater than a threshold slip, then the method 500 may determine that the HC trap is sufficiently oxidized and may terminate the lean preconditioning to avoid oxidizing the TWC. The threshold slip may be based on a non-zero positive number.

Turning now to FIG. 6, it shows a plot 600 illustrating a cold-start followed by a rich preconditioning and a lean preconditioning to return the TWC and HC trap to desired reactive states. Plot 610 represents an engine temperature and dashed line 612 represents a threshold cold-start temperature, plot 620 represents intake valve position, plot 630 represents a lambda value and dashed line 632 represents a stoichiometric lambda value, plot 640 represents a mass flow of water and dashed line 642 represents threshold flow of water which may impair the ability of the TWC to capture $NO_x$, plot 650 represents a TWC oxidation state and dashed line 652 represents an reactive state of the TWC where it is sufficiently reduced, and plot 660 represent a HC trap oxidation state and dashed line 662 represents a threshold oxidation corresponding to a sufficient oxidation of the HC trap. Time is shown on the x-axis of the plot 600, wherein time increases from a left to a right side of the figure.

Prior to $t_1$, the engine temperature (plot 610) is below the threshold cold-start temperature (dashed line 612). As such, a cold-start is occurring. Intake valve position (plot 620) is shown oscillating between open and closed positions. Lambda is greater than stoichiometric (plot 630 and dashed line 632, respectively). The mass flow of water (plot 640) is greater than the threshold flow of water (dashed line 642), wherein the water may poison the TWC and prevent its capture of $NO_x$ during the cold-start. The TWC oxidation (plot 650) is above the threshold oxidation (dashed line 652), thereby indicating that the TWC is sufficiently reduced to capture $NO_x$. The HC trap oxidation (plot 660) is less than the threshold oxidation (plot 662), thereby indicating that the HC trap may be substantially free of HCs.

As the cold-start continues, the HC trap may capture the water, while the TWC captures the $NO_x$ released by the engine during the cold-start. As such, the TWC may become oxidized, and its oxidation state may fall below the threshold reduction.

At $t_1$, the cold-start is complete as indicated by the engine temperature being greater than the threshold cold-start temperature. Intake valve operation continues to oscillate between open and closed. The mass flow of water is below the threshold flow of water. The TWC is oxidized and its oxidation state is below the threshold reduction. The HC trap is oxidized and its oxidation state is below the threshold oxidation.

Between $t_1$ and $t_2$, the rich preconditioning may be executed, wherein the intake valve operation may be adjusted such that the intake valves are moved to less open positions to allow less intake air to flow to the far vehicle underbody. As a result, both the TWC and the HC trap may begin to be reduced. Thus, the TWC oxidation increases toward the threshold reduction and the HC trap oxidation increases beyond the threshold oxidation as it captures some of the fuel in the exhaust gas.

At $t_2$, an engine fuel cut-off event occurs while the rich preconditioning is being executed. As a result, the intake valves are moved to fully closed positions to prevent air flow through the exhaust system.

Between $t_2$ and $t_3$, the fuel cut-off event continues with the intake valves being maintained in the closed position. The TWC and HC trap each continue to be reduced.

At $t_3$, the TWC reaches a reduced state above the threshold reduction, thereby indicating that the TWC is sufficiently reduced. As a result, the rich preconditioning may be executed. However, the HC trap is in an oxidation state above the threshold oxidation, thereby indicating that the HC trap may not be able to sufficiently capture HCs. As such, the lean preconditioning may be initiated.

Between $t_3$ and $t_4$, the fuel cut-off event continues and as a result, the intake valve position is adjusted such that the intake valve is maintained in a fully open position to permit more intake air flow therethrough. As the intake air flows to the far vehicle underbody, the air may oxidize HCs stored on the HC trap, thereby oxidizing the HC trap and moving its oxidation state nearer to the threshold oxidation. Additionally, by oxidizing the HCs, CO may be released, which may further reduce the TWC, as shown by the TWC oxidation state becoming more reduced.

At $t_4$, the HC trap oxidation state may be below the threshold oxidation, resulting the intake valve position moving to the fully closed position. In one example, the HC trap oxidation state is estimated to be below the threshold oxidation in response to a measured air slip downstream of the HC trap and upstream of the TWC. As such, to prevent oxidation of the TWC, the intake valve may be moved to the fully closed position or its position may be adjusted based on engine operating parameters. At any rate, the lean preconditioning is terminated.

After $t_4$, the engine is shut-off. The engine temperature drops to ambient and no air may flow to the far vehicle underbody as the intake valve is kept in the fully closed position.

Turning now to FIGS. 7A, 7B, 8A, and 8B, coated cordierite monolith samples were tested for NOx adsorption and conversion potential in a laboratory. Results of the tests are shown in FIGS. 7A, 7B, 8A, and 8D. Plots 700 and 800 of FIGS. 7A and 8A, respectively, depict results for a lean preconditioning and plots 750 and 850, respectively, depict results for a rich preconditioning.

All samples were exposed to an aging environment in an oven at 760° C. fed with iso-octane fuel combustion products and injected oxygen control that increased the reaction temperature over the samples from 740° C.-840° C. in 1 minute cycles for the 50 hour duration. This procedure produces full useful life level deterioration for the aftertreatment devices located in the far underbody location (e.g., the HC trap 182 and the TWC 178 of FIG. 2). Monolith core samples of 17.5 mm diameter by 25.4 mm length were placed just outside of an oven heating zone wrapped in a mat material. To precondition the samples for testing, the oven was heated to a sample temperature of 700° C. then 2 vol % $O_2$ was turned on for 120 s to fully oxidize the samples. Finally, the sample was cooled down to 30° C., the $O_2$ was turned off and the sample was considered to be preconditioned in the lean state (pre-lean) and ready for the next test. Alternatively, before the oxidized samples were cooled down, the $O_2$ was turned off and the sample was cooled to 400° C., then 1% $CO/H_2$ was turned on for 300 s to mostly reduce the samples, and finally the $CO/H_2$ was turned off and the sample was considered to be preconditioned in the rich state (pre-rich) and ready for the next test. With the sample initially at 30° C., the heated feed stream of 10 vol % $H_2O$ vapor and balance $N_2$ at 3 L/min was sent to the sample for 30 s to simulate ambient humidity exposure. The feed stream was then changed to the one used for the flow reactor NOx adsorption experiments and consisted of 200 ppm NO, 2400 ppm CO, 800 ppm $H_2$, 160 ppm benzene, 160 ppm iso-octane, and 160 ppm toluene, 10 vol % $H_2O$ vapor and balance air at 3 L/min. The 3-part HC blend brought the amount of total HC to 3360 ppmC1. This gas composition was chosen to simulate the cold-start exhaust emissions into the far underbody location and was introduced to the sample initially at 30° C. for 30 s. The feed stream was then changed to the one used for the flow reactor temperature programmed desorption (TPD) experiments and consisted of 50 ppm CO, 18 ppm $H_2$, 10% $H_2O$ vapor and balance $N_2$ at 3 L/min. This gas composition was chosen to simulate the warmed-up exhaust emissions into the far underbody location. The gas feed was introduced to the sample as the oven was heated at 60° C./m to 700° C. at the sample inlet and held. After a total TPD time of 600 s, the H$_2$O vapor was shut off and the sample was preconditioned to the desired condition. An MKS Fourier Transform Infra-Red (FTIR) analyzer was used downstream of the oven to measure the individual gas species of NOx (NO, NO$_2$, N$_2$O and NH$_3$) and enable calculation of the formation of N$_2$.

FIGS. 7A and 7B show that the TWC and HC trap samples tested individually had difficulty storing NOx in the simulated cold start environment, however the combination of the two samples in series (HC Trap then TWC) proved to have superior NOx adsorption capacity beyond that of a simple summation of the individual samples NOx storage capacities, as shown by the improved absorption depicted within box 710 of FIG. 7A and box 760 of FIG. 7B. Therefore the water adsorption capability of the upstream HC trap promotes NOx storage on the downstream TWC. As evidence, when water was completely removed from the test procedure, the TWC sample demonstrated complete inlet NOx adsorption efficiency. It is also shown that sample preconditioning had little effect on inlet NOx adsorption.

FIGS. 8A and 8B show that the TWC and HC trap samples tested individually had difficulty converting the stored NOx to N$_2$ in the simulated warmed-up exhaust environment, however the combination of the two samples in series (HC Trap then TWC) proved to have superior NOx conversion to N$_2$ beyond that of a simple summation of the individual samples N$_2$ conversion amount. Therefore the water adsorption capability of the upstream HC trap improves stored NOx conversion on the downstream TWC. As evidence, when water was completely removed from the test procedure, the TWC sample demonstrated even higher stored NOx conversion efficiency than the combination. It is also shown that rich sample preconditioning dramatically improved conversion of the stored NOx species to N$_2$ on the samples.

In one example of a vehicle comprising the aftertreatment devices in the far vehicle underbody was tested for emissions on the Federal Test Procedure (FTP-4) on a single roll chassis dynamometer test cell. The battery state of charge was 16% at the start of the test. The fuel used was LEV-III gasoline with 10% ethanol. The underbody system was either the production TWC or a HC Trap followed by a TWC after a 2 inch gap. The HC trap and TWC system used the same washcoats as described above. The catalysts were aged to simulate full useful life conditions of 150,000 miles.

TABLE 1 lists the regulated tailpipe emissions from both sets of exhaust systems in the first phase of the FTP4 test that includes the cold-start portion. Over the first phase of the FTP-4 emissions test, the HC trap+TWC underbody system reduced HC emissions by 10 mg/mi and NOx emissions by 10 mg/mi. The 5 test average results for the HC trap+TWC underbody system are a mixture of tests with preconditioning using the FTP4 cycle and also the US06 cycle.

TABLE 1

| FTP4 Phase 1 (0-505s) Tailpipe Emissions Measured | | | |
|---|---|---|---|
| Underbody System | HC [mg/mi] | CO [mg/mi] | NOx [mg/mi] |
| Production TWC (2 test average) | 32 | 375 | 22 |
| HC Trap + TWC (5 test average) | 22 | 600 | 12 |

TABLE 2 lists the regulated tailpipe emissions from both systems in the first 160 seconds of the FTP4 test, which is the cold-start portion. The results are preconditioned using the FTP4 cycle or the US06 cycle in lieu of possible intrusive exhaust gas environment perturbations as mentioned earlier. As a comparison, the amount of CO that entered the underbody location during the last phase of the FTP-4 (868 seconds) was 0.4 g, while during the US06 (600 seconds) was 6.8 g. Therefore the underbody systems conditioned with the US06 cycle could be considered more reduced than with the FTP4 cycle. Over the first 60 s of the FTP-4 emissions test, the Production TWC system could not store NOx emissions, yet the HC trap+TWC underbody system together stored 38-43 mg of NOx, regardless of preconditioning. However, the distribution of the stored NOx on either device was shifted by preconditioning. The pre-rich condition caused more NOx to be diverted past the HC trap to the TWC that could convert stored NOx at a higher conversion efficiency than the HC trap.

TABLE 2

| Effects of Preconditioning on the FTP4 Cold Start | | | | |
|---|---|---|---|---|
| Underbody System (previous test) | Adsorbed NOx 0-60s [mg] | Adsorbed NOx 0-60s [%] | Desorbed NOx 61-160s [mg] | Converted NOx 61-160s [%] |
| Production TWC (FTP-4) | 0 | 0% | 0 | 0% |
| HC Trap (FTP-4) | 41 | 78% | 25 | 39% |
| TWC (FTP-4) | 2 | 13% | 0 | 100% |
| HC Trap (US06) | 14 | 33% | 10 | 27% |
| TWC (US06) | 24 | 83% | 14 | 43% |

In this way, a far vehicle underbody arranged downstream of one or more close-coupled aftertreatment devices may comprise a HC trap arranged upstream of a TWC. The HC trap may comprise a water adsorbent material to mitigate and/or prevent water from flowing to the TWC. The technical effect of configuring the HC trap to capture water is to prevent water from chemisorbing onto surfaces of the TWC during a cold-start. Thus, the TWC may capture NO$_x$ during the cold-start, thereby decreasing NO$_x$ emissions. Additionally, due to the location of the HC trap and the TWC, degradation of the HC trap and the TWC may be delayed and/or prevented and the aftertreatment devices may retain catalytic activity well after the close-coupled catalysts are degraded and no longer catalytically active.

An example of a system comprises a hydrocarbon trap upstream of a three-way catalyst in a vehicle underbody, where the vehicle underbody is a threshold distance downstream of an aftertreatment device close-coupled to the engine and a controller having computer readable instructions stored on non-transitory memory that when executed enable the controller to adjust engine intake valve operation in response to an amount of NO$_x$ generated upon a subsequent engine start. A first example of the system, further includes where hydrocarbon trap comprises adsorbent material configured to store water and hydrocarbons. A second example of the system, optionally including the first example, further includes where the three-way catalyst comprises materials configured to store NOx during an engine cold-start, and where the materials convert the NO$_x$ to N$_2$ after the engine cold-start. A third example of the system, optionally including the first and/or second examples, further includes where the threshold distance is between 10 to 20 inches. A fourth example of the system, optionally including one or more of the first through third examples, further includes where the threshold distance is between 13-17 inches. A fifth example of the system, optionally including one or more of the first through fourth examples, further includes where the controller adjusted the engine intake valve operation in response to the amount of $NO_x$ generated upon the subsequent engine start being greater than a threshold $NO_x$, wherein the adjusting includes moving intake valves to more closed positions to reduce the three-way catalyst. A sixth example of the system, optionally including one or more of the first through fifth examples, further includes where the adjusting further includes moving the intake valves to a fully closed position during a fuel cutoff event. A seventh example of the system, optionally including one or more of the first through sixth examples, further includes where the adjusting includes moving the intake valve to more open positions to oxidize the hydrocarbon trap.

An example of a method comprises executing a rich preconditioning of a hydrocarbon trap and a three-way catalyst in response to a subsequent engine start being a cold-start and estimating an airflow based on feedback from a sensor arranged downstream of a close-coupled catalyst, the close-coupled catalyst being arranged upstream of the hydrocarbon trap and the three-way catalyst with respect to a direction of exhaust gas flow. A first example of the method further comprises performing the rich preconditioning in response to an amount of water present upon the subsequent engine start being greater than a threshold amount of water, where the threshold amount of water is based on a combination of a size of the TWC and an estimated engine $NO_x$ output upon the subsequent engine start. A second example of the method, optionally including the first example, further includes where the amount of water is estimated via a charge air cooler condensate level, current ambient humidity, and future weather forecast. A third example of the method, optionally including the first and/or second examples, further includes where the rich preconditioning comprises a lambda value between 0.95 and 0.99. A fourth example of the method, optionally including one or more of the first through third examples, further includes where terminating the rich preconditioning in response to the three-way catalyst reaching a threshold reduction state. A fifth example of the method, optionally including one or more of the first through fourth examples, further includes where following the terminating of the rich preconditioning, executing a lean preconditioning of the HC trap, wherein the lean preconditioning comprises a lambda value between 1.0 to 1.1. A sixth example of the method, optionally including one or more of the first through fifth examples, further includes where the lean preconditioning is terminated in response to feedback from an oxygen sensor arranged between the HC trap and the TWC, wherein the oxygen sensor monitors oxygen slip through the HC trap. A seventh example of the method, optionally including one or more of the first through sixth examples, further includes where HC trap comprises a passive $NO_x$ adsorber.

An example of a system comprises an engine, a close-coupled catalyst arranged less than 12 inches away from the engine in an exhaust passage configured to receive exhaust gas from the engine, a hydrocarbon trap upstream of a three-way catalyst, the hydrocarbon trap arranged downstream of the close-coupled catalyst by a distance greater than or equal to 15 inches with respect to a direction of exhaust gas flow, and a controller with computer readable instructions stored on non-transitory memory thereof that when executed enable to controller to execute a rich preconditioning, the rich preconditioning comprising a lambda between 0.95 and 0.99 and execute a lean preconditioning following the rich preconditioning, where the lean preconditioning comprises a lambda between 1.0 and 1.1. A first example of the system further includes where the rich preconditioning further comprises adjusting intake valve operation during a fuel cutoff event, the adjusting comprising moving intake valves of the engine to less open positions or to a fully closed position. A second example of the system, optionally including the first examples, further includes where the lean preconditioning further comprises adjusting intake valve operation during a fuel cutoff event, the adjusting comprising moving intake valves of the engine to more open position or to a fully closed position. A third example of the system, optionally including the first and/or second examples, further includes where the lean preconditioning is terminated in response to an amount of oxygen flowing through the hydrocarbon trap to the three-way catalyst being greater than a threshold oxygen slip. A fourth example of the system, optionally including one or more of the first through third examples, further includes where the hydrocarbon trap comprises 50 g/ft$^3$ of Pd/Rh in its washcoat and where the three-way catalyst comprises 150 g/ft$^3$ of Pd/Rh.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a hydrocarbon trap upstream of a three-way catalyst in a vehicle underbody, where the vehicle underbody is a threshold distance downstream of an aftertreatment device close-coupled to an engine; and
a controller having computer readable instructions stored on non-transitory memory that, when executed, enable the controller to:
adjust engine intake valve operation in response to an amount of $NO_x$ generated upon a subsequent engine start; and
perform rich preconditioning of the hydrocarbon trap and the three-way catalyst in response to an amount of water present upon the subsequent engine start being greater than a threshold amount of water.

2. The system of claim 1, wherein the hydrocarbon trap comprises a zeolite with a ratio of Si to $Al_2$ of less than 40.

3. The system of claim 1, wherein the three-way catalyst comprises materials configured to store NOx during an engine cold-start, and where the materials convert the $NO_x$ to $N_2$ after the engine cold-start.

4. The system of claim 1, wherein the threshold distance is between 10 to 20 inches.

5. The system of claim 1, wherein the threshold distance is between 13 to 17 inches.

6. The system of claim 1, wherein the controller adjusts the engine intake valve operation in response to the amount of $NO_x$ generated upon the subsequent engine start being greater than a threshold $NO_x$, and wherein the adjusting includes moving intake valves to more closed positions to reduce the three-way catalyst.

7. The system of claim 6, wherein the adjusting further includes moving the intake valves to a fully closed position during a fuel cutoff event.

8. The system of claim 6, wherein the adjusting includes moving the intake valves to more open positions to oxidize the hydrocarbon trap.

9. A method comprising:
executing a rich preconditioning of a hydrocarbon trap and a three-way catalyst in response to a subsequent engine start being a cold-start;
estimating an airflow based on feedback from a sensor arranged downstream of a close-coupled catalyst, the close-coupled catalyst being arranged upstream of the hydrocarbon trap and the three-way catalyst with respect to a direction of exhaust gas flow; and
performing the rich preconditioning in response to an amount of water present upon the subsequent engine start being greater than a threshold amount of water, where the threshold amount of water is based on a combination of a size of the three-way catalyst and an estimated engine $NO_x$ output upon the subsequent engine start.

10. The method of claim 9, wherein the amount of water is estimated via a charge air cooler condensate level, current ambient humidity, and future weather forecast.

11. The method of claim 9, wherein the rich preconditioning comprises a lambda value between 0.95 and 0.99.

12. The method of claim 9, further comprising terminating the rich preconditioning in response to the three-way catalyst reaching a threshold reduction state.

13. The method of claim 12, further comprising, following the terminating of the rich preconditioning, executing a lean preconditioning of the hydrocarbon trap, wherein the lean preconditioning comprises a lambda value between 1.0 to 1.1.

14. The method of claim 13, wherein the lean preconditioning is terminated in response to feedback from an oxygen sensor arranged between the hydrocarbon trap and the three-way catalyst, and wherein the oxygen sensor monitors oxygen slip through the hydrocarbon trap.

15. A system comprising:
an engine;
a close-coupled catalyst arranged less than 12 inches away from the engine in an exhaust passage configured to receive exhaust gas from the engine;
a hydrocarbon trap upstream of a three-way catalyst, the hydrocarbon trap arranged downstream of the close-coupled catalyst by a distance greater than or equal to 15 inches with respect to a direction of exhaust gas flow; and
a controller with computer readable instructions stored on non-transitory memory thereof that, when executed, enable the controller to:
execute a rich preconditioning of the hydrocarbon trap and the three-way catalyst in response to a subsequent engine start being a cold-start, and execute the rich preconditioning in response to an amount of water present upon the subsequent engine start being greater than a threshold amount of water, where the threshold amount of water is based on a combination of a size of the three-way catalyst and an estimated engine $NO_x$ output upon the subsequent engine start, the rich preconditioning comprising a lambda value between 0.95 and 0.99; and
execute a lean preconditioning following the rich preconditioning, where the lean preconditioning comprises a lambda value between 1.0 and 1.1.

16. The system of claim 15, wherein the rich preconditioning further comprises adjusting intake valve operation during a fuel cutoff event, the adjusting comprising moving intake valves of the engine to a less open position or to a fully closed position.

17. The system of claim 15, wherein the lean preconditioning further comprises adjusting intake valve operation during a fuel cutoff event, the adjusting comprising moving intake valves of the engine to a more open position or to a fully closed position.

18. The system of claim 17, wherein the lean preconditioning is terminated in response to an amount of oxygen flowing through the hydrocarbon trap to the three-way catalyst being greater than a threshold oxygen slip.

19. The system of claim 17, wherein the hydrocarbon trap comprises 50 $g/ft^3$ of Pd/Rh in its washcoat and where the three-way catalyst comprises 150 $g/ft^3$ of Pd/Rh.

* * * * *